United States Patent
Lin et al.

(10) Patent No.: US 10,194,332 B2
(45) Date of Patent: Jan. 29, 2019

(54) LED ILLUMINATING APPARATUS, AND RELATED SIGNAL AMPLIFYING SYSTEM

(71) Applicant: ZHEJIANG SHENGHUI LIGHTING CO., LTD, Jiaxing (CN)

(72) Inventors: Xinwang Lin, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 15/545,574

(22) PCT Filed: Sep. 19, 2016

(86) PCT No.: PCT/CN2016/099301
§ 371 (c)(1),
(2) Date: Jul. 21, 2017

(87) PCT Pub. No.: WO2017/054656
PCT Pub. Date: Apr. 6, 2017

(65) Prior Publication Data
US 2018/0014207 A1    Jan. 11, 2018

(30) Foreign Application Priority Data

Sep. 30, 2015 (CN) .......................... 2015 1 0639983

(51) Int. Cl.
*H04W 16/26* (2009.01)
*H04W 88/04* (2009.01)
(Continued)

(52) U.S. Cl.
CPC ......... *H04W 16/26* (2013.01); *F21V 33/0004* (2013.01); *H04B 7/15507* (2013.01);
(Continued)

(58) Field of Classification Search
CPC ....... H04B 7/15507; H05B 33/02; H04L 5/14; F21V 33/0004; H04W 16/26; H04W 88/04
See application file for complete search history.

(56) References Cited

U.S. PATENT DOCUMENTS 6,222,503 B1 * 4/2001 Gietema ............. H01Q 1/1207
343/700 MS
8,023,885 B2 * 9/2011 Proctor, Jr. .......... H04B 7/1555
455/11.1
(Continued)

FOREIGN PATENT DOCUMENTS

CN    202222002 U    5/2012
CN    203675107 U    6/2014
(Continued)

*Primary Examiner* — Chi H Pham
*Assistant Examiner* — Weibin Huang
(74) *Attorney, Agent, or Firm* — Anova Law Group, PLLC

(57) ABSTRACT

The present disclosure provides a Light Emitting Diode (LED) illuminating apparatus. The illuminating apparatus includes a first antenna, a second antenna, a signal amplifying unit, an LED lighting unit, and an LED driving power supply. The LED driving power supply is connected with the signal amplifying unit and the LED lighting unit to drive the LED lighting unit to emit light and to provide power to the signal amplifying unit. The first antenna and the second antenna are connected to the signal amplifying unit. The first antenna receives a base station signal, and transmits the base station signal to the signal amplifying unit. The signal amplifying unit amplifies the base station signal, and transmits the amplified base station signal to the second antenna. The second antenna transmits the amplified base station signal to a terminal. The second antenna further receives a terminal signal, and transmits the terminal signal to the signal amplifying unit. The signal amplifying unit further
(Continued)

amplifies the terminal signal, and transmits the amplified terminal signal to the first antenna. The first antenna further transmits the amplified terminal signal to a base station.

18 Claims, 3 Drawing Sheets

(51) Int. Cl.
    *H05B 33/02*     (2006.01)
    *F21V 33/00*     (2006.01)
    *H04B 7/155*     (2006.01)
    *H04L 5/14*     (2006.01)
    *F21Y 115/10*     (2016.01)
    *H01Q 1/22*     (2006.01)

(52) U.S. Cl.
    CPC ............... *H04L 5/14* (2013.01); *H04W 88/04* (2013.01); *H05B 33/02* (2013.01); *F21Y 2115/10* (2016.08); *H01Q 1/22* (2013.01)

(56) References Cited

U.S. PATENT DOCUMENTS

| 2004/0110469 | A1* | 6/2004 | Judd | G01S 19/25 |
| | | | | 455/15 |
| 2005/0272367 | A1* | 12/2005 | Rodgers | H04B 7/15564 |
| | | | | 455/11.1 |
| 2010/0144337 | A1* | 6/2010 | Dean | H04W 24/02 |
| | | | | 455/422.1 |
| 2010/0159823 | A1 | 6/2010 | Smith | |

FOREIGN PATENT DOCUMENTS

| CN | 203675370 U | 6/2014 |
| CN | 105187125 A | 12/2015 |
| CN | 205071001 U | 3/2016 |

\* cited by examiner

LED ILLUMINATING APPARATUS, AND RELATED SIGNAL AMPLIFYING SYSTEM

CROSS-REFERENCES TO RELATED APPLICATIONS

This application is a national phase entry under 35 U.S.C. § 371 of International Application No. PCT/CN2016/099301, filed on Sep. 19, 2016, which claims priority to Chinese Patent Application No. 201510639983.8, filed on Sep. 30, 2015. The above enumerated patent applications are incorporated by reference herein in their entirety.

TECHNICAL FIELD

The disclosed subject matter generally relates to the field of lighting and, more particularly, relates to an LED illuminating apparatus, and a related signal amplifying system.

BACKGROUND

Light Emitting Diode (LED) is solid-state semiconductor device that can directly convert electrical energy into an visible light. LED lights have many advantages, such as energy saving, environmental protection, lighting controllability, great applicability, high stability, short response time, long life, etc. Therefore in order to achieve a low-carbon living style, LED illumination apparatuses are widely used in various lighting fields. With the development of smart appliance technology, there are increasing interest in the smart terminal equipment in a smart home environment. The researches of how to integrate resources, how to enhance the functional applications of LED lights, and how to make smart home devices simpler and more integrated, are important to the current development of smart technology.

In addition, how to amplify the mobile phone signal inside buildings is also an important research topic of modern life. However, based on the shadow effect of mobile wireless communications, a signal blind spot of the mobile wireless communication may be formed in the back of the of high-rise buildings, or in the middle floors of high-rise buildings. Further, because of the electromagnetic wave shielding effect of a building, a signal blind spot of the mobile wireless communication may also be formed in an enclosed building. All these factors may cause a user mobile communication device cannot receive signals properly.

To solve this problem, often, mobile phone signal amplifiers can be installed in the signal blind regions, or in regions that have weak mobile communication signals. Normally, a mobile phone signal amplifier comprises two antennas and a signal amplifying unit. One of the antennas can be placed outdoors or in an area that has strong mobile phone signals, the other antenna can be placed indoors or in an area that needs a signal boost. The two antennas can be connected to the ports of the signal amplifying unit by using radio frequency (RF) coaxial cables. The signal amplifying unit can process the signal and amplify the signal. In order to ensure that the signal amplifying unit can work properly, the signal amplification unit is usually installed indoors, and is normally powered by an external power supply.

However, when installing a mobile phone signal amplifier, long RF coaxial cables may be necessary to connect the two antennas and the signal amplifying unit. Thus, there may exist many problems including cumbersome cable laying, signal attenuation due to the long length of the cable, requiring a separate external power supply for the signal amplifying unit, etc.

Accordingly, it is desire to provide an LED illuminating apparatus, and a related signal amplifying system.

BRIEF SUMMARY

In accordance with some embodiments of the disclosed subject matter, an LED illuminating apparatus, and a related signal amplifying system are provided.

An aspect of the present disclosure provides a Light Emitting Diode (LED) illuminating apparatus. The apparatus includes a first antenna, a second antenna, a signal amplifying unit, an LED lighting unit, and an LED driving power supply. The LED driving power supply is connected with the signal amplifying unit and the LED lighting unit to drive the LED lighting unit to emit light and to provide power to the signal amplifying unit. The first antenna and the second antenna are connected to the signal amplifying unit. The first antenna receives a base station signal, and transmits the base station signal to the signal amplifying unit. The signal amplifying unit amplifies the base station signal, and transmits the amplified base station signal to the second antenna. The second antenna transmits the amplified base station signal to a terminal. The second antenna further receives a terminal signal, and transmits the terminal signal to the signal amplifying unit. The signal amplifying unit further amplifies the terminal signal, and transmits the amplified terminal signal to the first antenna; and the first antenna further transmits the amplified terminal signal to a base station.

Further, the first antenna and the second antenna are located inside the LED illuminating apparatus.

Further, the first antenna and the second antenna are located outside the LED illuminating apparatus.

Further, the signal amplifying unit comprises a first duplexer, a second duplexer, a downlink and an uplink. The first duplexer is connected with the first antenna, an input terminal of the downlink, and an output terminal of the uplink respectively; and the second diplexer is connected with the second antenna, an output terminal of the downlink, and an input terminal of the uplink respectively.

Further, the first antenna is connected to a radio frequency port of the first duplexer; and the second antenna is connected to a radio frequency port of the second duplexer.

Further, the first duplexer receives the base station signal transmitted from the first antenna, and transmits the base station signal to the downlink; the downlink amplifies the base station signal, and transmits the amplified base station signal to the second duplexer; the second duplexer receives the amplified base station signal, and transmits the amplified base station signal to the terminal via the second antenna; the second duplexer further receives the terminal signal transmitted from the second antenna, and transmits the terminal signal to the uplink; the uplink amplifies the terminal signal, and transmits the amplified terminal signal to the first duplexer; and the first duplexer further receives the amplified terminal signal, and transmits the amplified terminal signal to the base station via the first antenna.

Further, the downlink includes a first power control unit, a first low-noise amplifier, a first filter, a first signal amplifier, a first coupler, and a first isolator that are connected in serial; an input terminal of the first low-noise amplifier is connected with an output terminal of the first duplexer; an output terminal of the first isolator is connected with an input terminal of the second duplexer; a power comparator input port of the first power control unit is connected with a coupling port of the first coupler; and a power comparator output port of the first power control unit is connected with a power control port of the first signal amplifier.

Further, the first low-noise amplifier amplifies the base station signal transmitted from the first duplexer, and sends the amplified base station signal to the first filter; the first filter filters the amplified base station signal, and sends the filtered base station signal to the first amplifier; the first signal amplifier re-amplifies the filtered base station signal, and sends the re-amplified base station signal to the first coupler; and the first coupler samples the re-amplified base station signal, and sends the sampled base station signal to the first power control unit through the coupling port of the first coupler.

Further, the first coupler further sends the sampled base station signal to the first isolator through the output port of the first coupler; the first power control unit converts the sampled base station signal into a first level signal by using a power comparator, and sends the first level signal back to the first signal amplifier to control a gain of the first signal amplifier; and the first isolator transmits the re-amplified base station signal to the second antenna via the second duplexer, and isolates the terminal signal transmitted from the second duplexer.

Further, a sampling ratio of the first coupler is 15-25 dB.

Further, converting the sampled base station signal into the first level signal includes selecting a value of a first reference power based on a current wireless communication signal environment; and comparing the sampled base station signal with the first reference power, and generating the first level signal based on the comparison.

Further, the uplink included a second power control unit, a second low-noise amplifier, a second filter, a second signal amplifier, a second coupler, and a second isolator that are connected in serial; an input terminal of the second low-noise amplifier is connected with an output terminal of the second duplexer; an output terminal of the second isolator is connected with an input terminal of the first duplexer; a power comparator input port of the second power control unit is connected with a coupling port of the second coupler; and a power comparator output port of the second power control unit is connected with a power control port of the second signal amplifier.

Further, the second low-noise amplifier amplifies the terminal signal transmitted from the second duplexer, and sends the amplified terminal signal to the second filter; the second filter filters the amplified terminal signal, and sends the filtered terminal signal to the second amplifier; the second signal amplifier re-amplifies the filtered terminal signal, and sends the re-amplified terminal signal to the second coupler; and the second coupler samples the re-amplified terminal signal, and sends the sampled terminal signal to the second power control unit through the coupling port of the second coupler.

Further, the second coupler further sends the sampled terminal signal to the second isolator through the output port of the second coupler; the second power control unit converts the sampled terminal signal into a second level signal by using a power, and sends the second level signal back to the second signal amplifier to control a gain of the second signal amplifier; and the second isolator transmits the re-amplified terminal signal to the first antenna via the first duplexer, and isolates the base station signal transmitted from the first duplexer.

Further, a sampling ratio of the second coupler is 15-25 dB.

Further, converting the sampled terminal signal into the second level signal includes selecting a value of a second reference power based on a current wireless communication signal environment; and comparing the sampled terminal signal with the second reference power, and generating the second level signal based on the comparison.

Further, the LED lighting unit is a blue LED light unit.

Another aspect of the present disclosure provides a signal amplifying system, including: a base station; a terminal; and a plurality of LED illuminating apparatuses described above.

Further, the plurality of LED illuminating apparatuses are located at different locations; the plurality of LED illuminating apparatuses receive the base station signal and the terminal signal from the base station and the terminal respectively, and amplify the base station signal and the terminal signal; and the plurality of LED illuminating apparatuses further receive the amplified base station signal and the amplified terminal signal from another LED illuminating apparatus, and re-amplify the amplified base station signal and the amplified terminal signal.

Further, at least one of the LED illuminating apparatuses is located outside a signal range of the base station; and at least one of the LED illuminating apparatuses is located outside a signal range of the terminal.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides an LED illuminating apparatus, and a related signal amplifying system.

Figure 1:
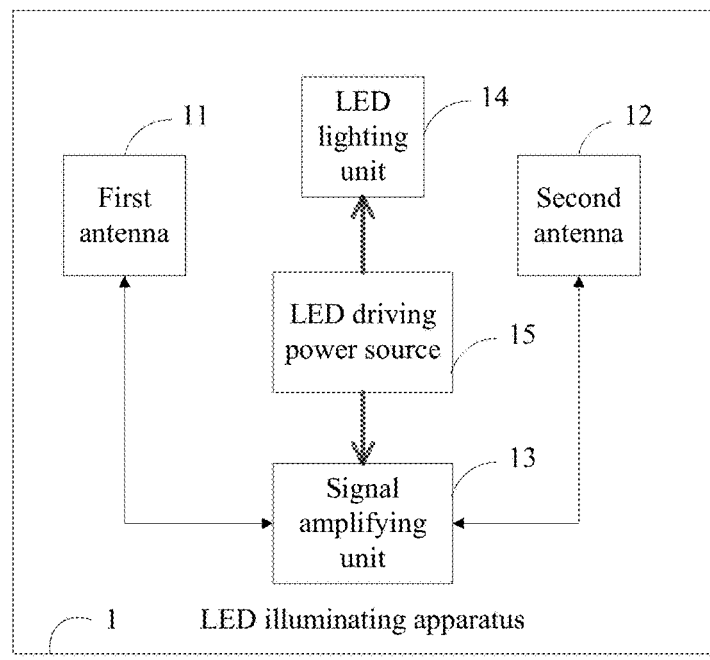
FIG. 1 is a schematic structural diagram of an exemplary LED illuminating apparatus in accordance with some embodiments of the disclosed subject matter.

FIG. 1 is a schematic structural diagram of an exemplary LED illuminating apparatus in accordance with some embodiments of the disclosed subject matter.

As illustrated, the disclosed LED illuminating apparatus 1 can include a first antenna 11, a second antenna 12, a signal amplifying unit 13, an LED lighting unit 14, and an LED driving power supply 15.

The LED driving power supply 15 can be connected with the signal amplifying unit 13 and the LED lighting unit 14 for driving the LED lighting unit 14 to emit light and for providing power to the signal amplifying unit 13.

Both of the first antenna 11 and the second antenna 12 are disposed in the interior of the LED illuminating apparatus 1, and are connected to the signal amplifying unit 13 respectively.

The first antenna 11 is used for receiving the base station signal, and transmitting the base station signals to the signal amplifying unit 13. The signal amplifying unit 13 is used for amplifying the base station signals, and transmitting the amplified base station signals to the second antenna 12. The second antenna 12 is used for transmitting the amplified base station signals to the terminals.

The second antenna 12 is used for receiving the terminal signals, and transmitting the terminal signals to the signal amplifying unit 13. The signal amplifying unit 13 is used for amplifying the terminal signals, and transmitting the amplified terminal signals to the first antenna 11. The first antenna 11 is used for transmitting the amplified terminal signals to the base station.

In some embodiments, the LED illuminating apparatus can be any suitable LED light with any suitable structure, as long as the LED light has enough space to dispose the first antenna 11, the second antenna 12, and the signal amplifying unit 13.

Note that, both of the first antenna 11 and the second antenna 12 can simultaneously receive base station signals and terminal signals. The terminal signals received by the first antenna 11 can be isolated. The base station signals received by the first antenna 11 can be amplified by the signal amplifying unit 13 and transmitted to the second antenna 12, and then send to the terminal. The base station signal received by the second antenna 12 can be isolated. The terminal signals received by the second antenna 12 can be amplified by the signal amplifying unit 13 and transmitted to the first antenna 11, and then send to the base station.

Accordingly, the disclosed LED illuminating apparatus can include a first antenna, a second antenna, a signal amplifying unit, an LED lighting unit, and an LED driving power supply. The LED driving power supply can be connected with the signal amplifying unit and the LED lighting unit for driving the LED lighting unit to emit light and for providing power to the signal amplifying unit. Both of the first antenna and the second antenna are disposed in the interior of the LED illuminating apparatus, and are connected to the signal amplifying unit respectively.

Therefore, a signal amplifying function can be integrated into the LED illuminating apparatus. An integrated lighting and signal amplifying device can be realized. The first antenna, the second antenna, and signal amplifying unit can be disposed inside of the LED illuminating apparatus without laying long-distance RF cables. Thus, the disclosed LED illuminating apparatus has a simple connection which may reduce terminal signal attenuation. The LED driving power source can be used for providing energy directly to the signal amplifying unit, so there is no separate power supply for the signal amplifying unit. In addition, both the antennas are disposed indoors to avoid possible damaged caused by lightning strikes. Therefore, the product costs can be reduced, and the continuity of the signal amplification can be ensured.

Figure 2:
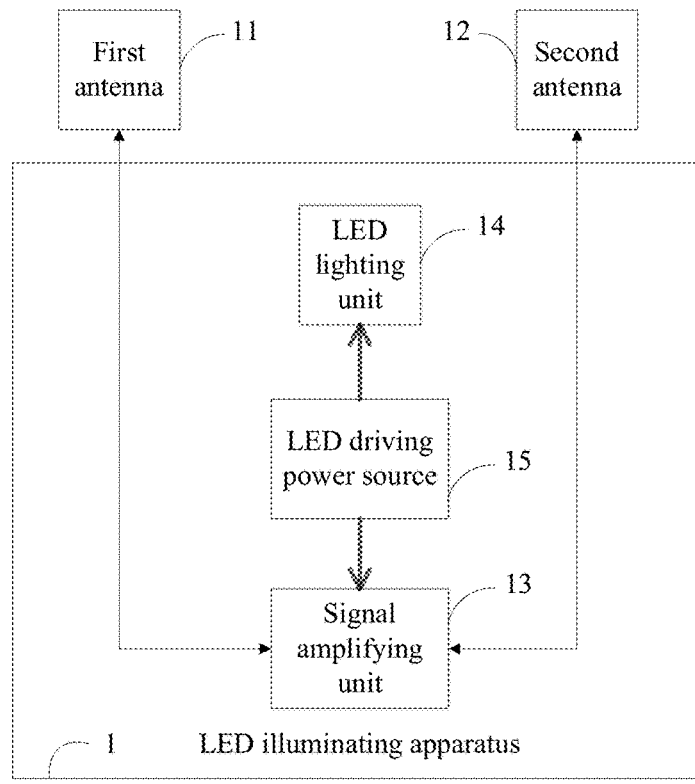
FIG. 2 is a schematic structural diagram of an exemplary LED illuminating apparatus in accordance with some embodiments of the disclosed subject matter.

Referring to FIG. 2, a schematic structural diagram of an exemplary LED illuminating apparatus in accordance with some embodiments of the disclosed subject matter.

Comprising to the LED illuminating apparatus described above in connection with FIG. 1, both of the first antenna 11 and the second antenna 12 are provided outside of the LED illuminating apparatus 1, as illustrated in FIG. 2. Since both of the two antennas are disposed outside of the LED illuminating apparatus, they can make a better signal transmitting result, and can further ensure the signal amplifying effect.

Figure 3:
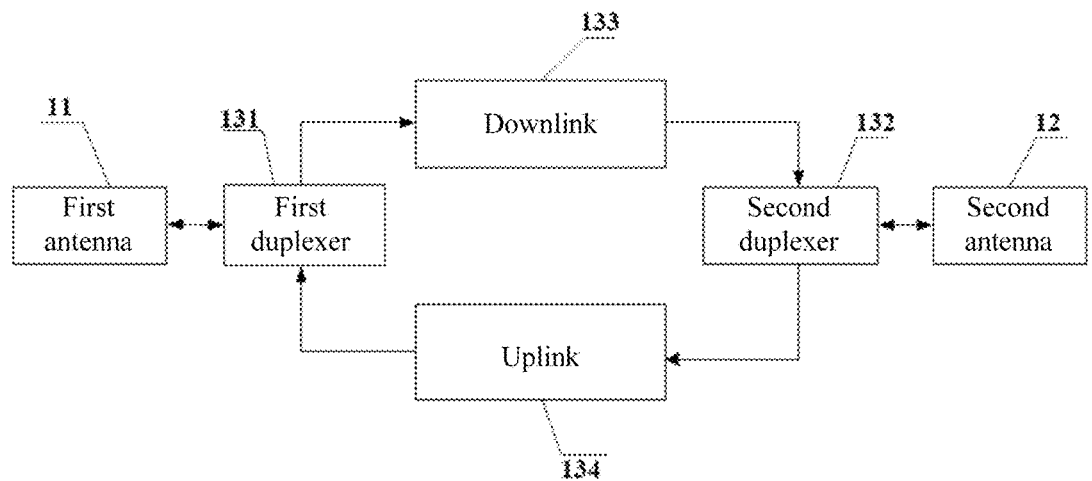
FIG. 3 is a schematic structural diagram of an exemplary signal amplifying unit in accordance with some embodiments of the disclosed subject matter.

Referring to FIG. 3, a schematic structural diagram of an exemplary signal amplifying unit is shown in accordance with some embodiments of the disclosed subject matter.

As illustrated, the signal amplifying unit 13 may include a first duplexer 131, a second duplexer 132, a downlink 133, and an uplink 134.

The first duplexer 131 is connected with the first antenna 11, an input terminal of the downlink 133, and an output terminal of the uplink 134 respectively. The second diplexer 132 is connected with the second antenna 12, an output terminal of the downlink 133, and an input terminal of the uplink 134 respectively.

In one embodiment, the first antenna 11 can transmit the received base station signals and terminal signals to the first duplexer 131. Based on the frequency selection of the base station signals and terminal signals, the first duplexer 131 can transmit the base station signals to the downlink 133. The downlink 133 can amplify the base station signals, and transmit the amplified base station signals to the second duplexer 132. The second duplexer 132 can receive the amplified base station signals, and transmit the amplified base station signals to a terminal through the second antenna 12.

The first antenna 12 can transmit the received base station signals and terminal signals to the second duplexer 132. Based on the frequency selection of the base station signals and terminal signals, the second duplexer 132 can transmit the terminal signals to the uplink 134. The uplink 134 can amplify the terminal signals, and transmit the amplified terminal signals to the first duplexer 131. The first duplexer 131 can receive the amplified terminal signals, and transmit the amplified terminal signals to a base station through the first antenna 11.

Specifically, the first antenna 11 can be connected to an RF port of the first duplexer 131, and the second antenna 12 can be connected to an RF port of the second duplexer 132.

Figure 4:
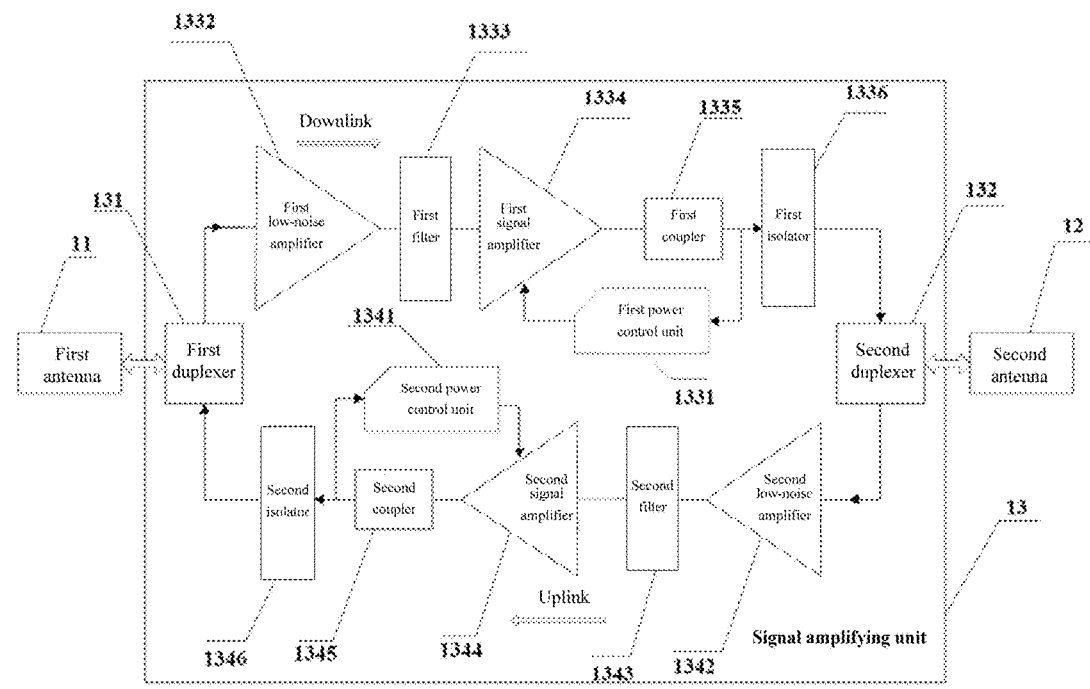
FIG. 4 is a schematic structural diagram of an exemplary signal amplifying unit in accordance with some embodiments of the disclosed subject matter.

Referring to FIG. 4, a schematic structural diagram of an exemplary signal amplifying unit is shown in accordance with some embodiments of the disclosed subject matter. As illustrated, the downlink 133 and uplink 134 can be described in details in the following paragraphs.

In some embodiments, the downlink 133 can include a first power control unit 1331, a first low-noise amplifier 1332, a first filter 1333, a first signal amplifier 1334, a first coupler 1335, and a first isolator 1336 that are connected in serial.

An input terminal of the first low-noise amplifier 1332 is connected with an output terminal of the first duplexer 131. An output terminal of the first isolator 1336 is connected with an input terminal of the second duplexer 132.

A power comparator input port of the first power control unit 1331 is connected with a coupling port of the first coupler 1335. A power comparator output port of the first power control unit 1331 is connected with a power control port of the first signal amplifier 1334.

In one embodiment, the first low-noise amplifier 1332 can amplify the base station signals transmitted from the first duplexer 131, and send the amplified base station signals to the first filter 1333. The first filter 1333 can filter the base station signals and send the filtered base station signals to the first amplifier 1334. The first signal amplifier 1334 can re-amplify the filtered base station signals, and send the re-amplified base station signals to the first coupler 1335. The first coupler 1335 can sample the re-amplified base station signals, and send the sampled base station signals to the first power control unit 1331 through the coupling port of the first coupler 1335. In some embodiments, a sampling ratio of the first coupler 1335 is 15-25 dB.

The first coupler 1335 also send the sampled base station signals to the first isolator 1336 through the output port of the first coupler 1335. The first power control unit 1331 can use a power comparator inside the first power control unit 1331 to convert the sampled base station signals into a first level signals. The first level signals can be sent back to the first signal amplifier 1334 to control the gain of the first signal amplifier 1334. The first isolator 1336 can transmit the re-amplified base station signals to the second antenna 12 via the second duplexer 132, and can isolate the signals transmitted from the second duplexer 132.

Specifically, the power comparator of the first power control unit 1331 can compare the sampled base station signals with a first reference power, and generate a first voltage value. The first voltage value can be input to the first amplifier 1334 for gain control. The first reference power can vary with the changes of the signal environment. The first power control unit 1331 can select different values of the first reference power based on the current signal environment. The first power control unit 1331 uses a closed loop power control mode to accurately control the output power of the re-amplified base station signal in a desired value range.

In some embodiments, the uplink 134 can include a second power control unit 1341, a second low-noise amplifier 1342, a second filter 1343, a second signal amplifier 1344, a second coupler 1345, and a second isolator 1346 that are connected in serial.

An input terminal of the second low-noise amplifier 1342 is connected with an output terminal of the second duplexer 132. An output terminal of the second isolator 1346 is connected with an input terminal of the first duplexer 131.

A power comparator input port of the second power control unit 1341 is connected with a coupling port of the second coupler 1345. A power comparator output port of the second power control unit 1341 is connected with a power control port of the second signal amplifier 1344.

In one embodiment, the second low-noise amplifier 1342 can amplify the terminal signals transmitted from the second duplexer 132, and send the amplified terminal signals to the second filter 1343. The second filter 1343 can filter the terminal signals and send the filtered terminal signals to the second amplifier 1344. The second signal amplifier 1344 can re-amplify the filtered terminal signals, and send the re-amplified terminal signals to the second coupler 1345. The second coupler 1345 can sample the re-amplified terminal signals, and send the sampled terminal signals to the second power control unit 1341 through the coupling port of the second coupler 1345. In some embodiments, a sampling ratio of the second coupler 1345 is 15-25 dB.

The second coupler 1345 also send the sampled terminal signals to the second isolator 1346 through the output port of the second coupler 1335. The second power control unit 1341 can use a power comparator, which can be inside the second power control unit 1341, to convert the sampled terminal signal into a second level signal. The second level signal can be send back to the second signal amplifier 1344 to control the gain of the second signal amplifier 1344. The second isolator 1346 can transmit the re-amplified terminal signals to the first antenna 11 via the first duplexer 131, and can isolate the signals transmitted from the first duplexer 131.

Specifically, the power comparator of the second power control unit 1341 can compare the sampled terminal signals with a second reference power, and generate a second voltage value. The second voltage value can be supplied to the second amplifier 1344 for gain control. The second reference power can vary with the changes of signal environment. The second power control unit 1341 can select different values of the second reference power based on the current signal environment. The second power control unit 1341 uses a closed loop power control mode to accurately control the output power of the re-amplified terminal signals in a desired value range.

In the following paragraphs, an example is further described in detail by using a mobile phone as the terminal. Specifically, under a Global System for Mobile Communication (GSM) signal environment, the signal transmission links can include uplink and downlink.

The uplink is defined as the signal link that transmits from the mobile phone to the base station, which means that the mobile phone transmits the phone signal, and the base station receives the phone signal via the uplink. The frequency of the uplink signal (phone signal) is 880~915 MHz.

The downlink is defined as the signal link that transmits from the base station to the mobile phone, which means that the base station transmits the base station signal, and the mobile phone receives the base station signal via the downlink. The frequency of the downlink signal (base station signal) is 925~960 MHz.

Each of the first and second duplexers can include a high-pass filter and a low-pass filter. The high-pass filter can allow the downlink signal within frequency range of 925~960 MHz to pass through, and can isolate the uplink signal. The low-pass filter can allow the uplink signal with in frequency range of 880~915 MHz to pass through, and can isolate downlink signal.

When the first duplexer receives the base station signal and the phone signal, the base station signal as a downlink signal goes through the high-pass filter of the first duplexer, then goes through the downlink to be amplified. The phone signal as an uplink signal goes through the low-pass filter of the first duplexer, then goes through the uplink, and then can be blocked by the second isolator.

Similarly, when the second duplexer receives the base station signal and the phone signal, the phone signal as a uplink signal goes through the low-pass filter of the second duplexer, then goes through the uplink to be amplified. The base station signal as an downlink signal goes through the high-pass filter of the second duplexer, goes through the downlink, and then can be blocked by the first isolator.

Figure 5:
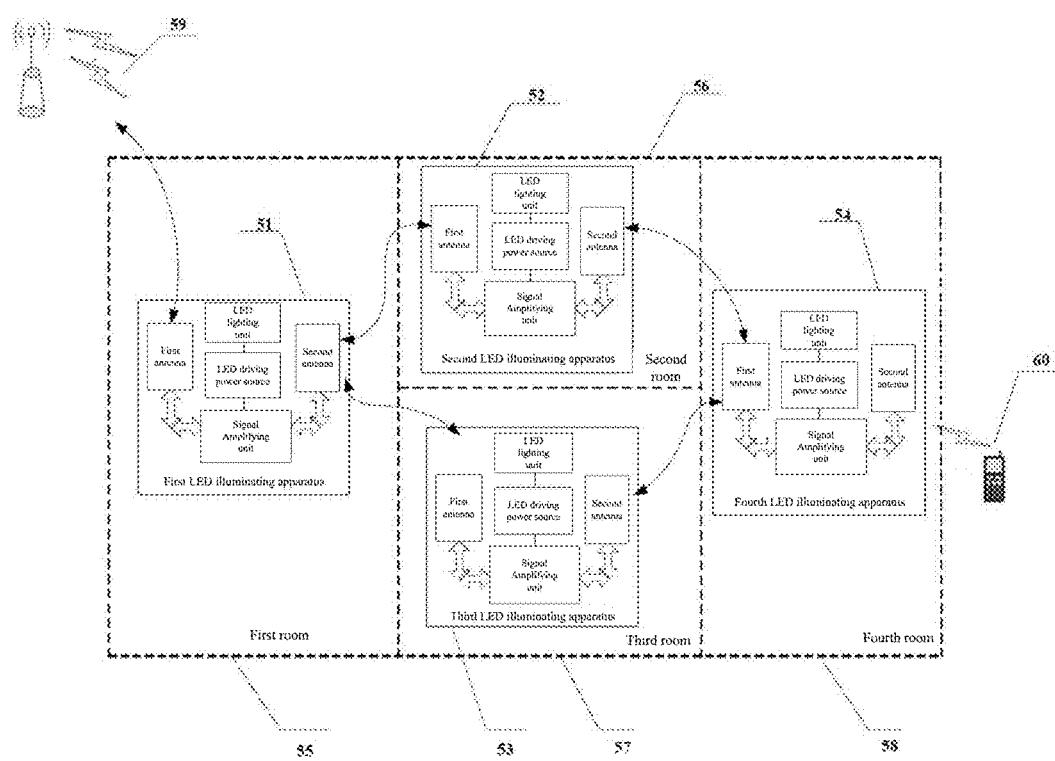
FIG. 5 is a schematic diagram of an exemplary signal amplifying system based on LED illuminating apparatuses in accordance with some embodiments of the disclosed subject matter.

Referring to FIG. 5, a schematic diagram of an exemplary signal amplifying system based on LED illuminating apparatuses is shown in accordance with some embodiments of the disclosed subject matter.

As illustrated, the signal amplifying system can include a base station 59, a terminal 60, and multiple LED illuminating apparatus as described above in connection with FIGS. 1-4.

Each LED illuminating apparatus is located at a different place.

Each LED illuminating apparatus can be used for receiving base station signals, terminal signals, and amplifying the received base station signals and terminal signals.

Each LED illuminating apparatus can also be used for receiving amplified base station signals and terminal signals transmitted from another LED illuminating apparatus, and further amplifying the received amplified base station signals and terminal signals.

The terminal 60 can receive amplified base station signals from at least one LED illuminating apparatus that has a distance to the terminal 60 that is shorter than a first pre-determined distance.

The base station 59 can receive amplified terminal signals from at least one LED illuminating apparatus that has a distance to the base station 59 that is shorter than a second pre-determined distance.

As illustrated in FIG. 5, the exemplary signal amplifying system includes four LED illumination apparatuses 51-54. The first LED illumination apparatus 51 may be located in a first room 55. The second LED illumination apparatus 52 may be located in a second room 56. The third LED illumination apparatus 53 may be located in a first room 57. The fourth LED illumination apparatus 54 may be located in a fourth room 58.

The first room 55 may be a shortest distance from the outdoor base station. The second room 56 and the third room 57 may be a roughly same distance from the outdoor base station. The first room 55, which is the location of the terminal 60, may be a longest distance from the base station.

Further, the first pre-determined distance and second pre-determined distance are signal ranges of the terminal or the base station respectively. In the example illustrated in FIG. 5, when the terminal is a mobile phone, the second, third and fourth LED illuminating apparatuses 52-54 are within the first pre-determined distance from the mobile phone. Thus the mobile phone can receive amplified base station signals transmitted from the second, third and fourth LED illuminating apparatuses 52-54. The first, second and third LED illuminating apparatuses 51-53 are within the second pre-determined distance from the base station. Thus the base station can receive amplified phone signals transmitted from the first, second, and third LED illuminating apparatuses 51-53.

When the base station 59 transmits signals to mobile phone, the first LED illuminating apparatus 51 is of a relatively shortest distance from the base station, so it may receive the strongest base station signals. The first LED illuminating apparatus 51 can amplify the received base station signals and transmit the amplified base station signals via the second antenna.

The second and third LED illuminating apparatuses 52 and 53 can receive both the base station signal from the base station 49, and the amplified base station signal from the first LED illuminating apparatus 51. Since the amplified base station signal from the first LED illuminating apparatus 51 may be stronger than the base station signal from the base station 59, the second and third LED illuminating apparatuses 52 and 53 can give priority to receive the amplified base station signal from the first LED illuminating apparatus 51, and can re-amplify the received amplified base station signals from the first LED illuminating apparatus 51, and then transmit the re-amplified base station signals via the second antenna.

Similarly, the fourth LED illuminating apparatus 54 can give priority to receive and then re-amplify the re-amplified base station signals from the second LED illuminating apparatus 52 or the third LED illuminating apparatus 53. The base station signals can be amplified three time, and then be received by the mobile phone.

In some embodiments, the mobile phone can receive the amplified base station signals transmitted from the second, third and fourth LED illuminating apparatuses 52-54. That is, the mobile phone can receive different strength base station signals, and each LED illuminating apparatus can also receive different strength base station signals. However, each LED illuminating apparatus can give priority to receive and amplify the strongest base station signals. Finally, the mobile phone can received a base station signal that has been amplified three times.

Based on same working principles that the phone signals can also be received and amplified by the multiple LED illuminating apparatuses 51-54, the base station can receive a phone signal that has been amplified three times.

In some embodiments, there may be 2N number of LED illuminating apparatuses in a signal amplifying system to transmit signals from a base station to a mobile terminal, such as a mobile phone. In one example, similar to the configuration in FIG. 5, LED illuminating apparatus 51 may be in the signal transmitting range of base station 59. LED illuminating apparatus 54 may be in the signal transmitting range of mobile terminal 60. However, there may be multiple pairs of LED illuminating apparatuses 52/53, 52A/53A, 52B/53B, . . . , which can receive and transmit signals from LED illuminating apparatus 51 (and/or the base station 59) and LED illuminating apparatus 54 (and/or the mobile terminal 60). The base station signals and mobile terminal signals may thus be amplified and transmitted in a large area.

In some embodiments, an LED illuminating apparatus may include duplicate antennas and/or signal amplifying units. When a nearby LED illuminating apparatus fails to receive or transmit signals, the LED illuminating apparatus may include duplicate antennas and signal amplifying units may take over and operate both the downlink and uplink on one LED illuminating apparatus. Referring to FIG. 5, for example, if LED illuminating apparatus 52 fails to receive or transmit signals, the LED illuminating apparatus 53 may act as both the downlink and uplink to transmit signals between LED illuminating apparatuses 51 and 54.

In some embodiments, LED illuminating apparatus may include an indicator light. If LED illuminating apparatus fails to receive or transmit signals, the indicator light may change color (e.g., from green to red), or make other indications (e.g., blinking), to show that the failure of its communication functions. In some embodiments, the indicator light may further indicate (e.g., turning on a yellow light) the LED illuminating apparatus fails to transmit signals and has been replace by another LED illuminating apparatus nearby.

In some embodiments, the mobile terminal 60 may view a map of the signal amplifying system as described. Referring to FIG. 5, the mobile terminal 60 may show a map that displays base station 59, LED illuminating apparatuses 51-54, and their signal transmission paths to mobile terminal 60.

Therefore, in some embodiments, the disclosed signal amplifying system can dispose multiple LED illuminating apparatuses at different locations. As a result, the base station signals and the terminal signals can be amplified multiple times in a roll. Both of the base station and the terminal can receive amplified signals that have been amplified multiple times. Therefore, the signal amplification function can be greatly enhanced. Additionally, the signals can be amplified and transmitted by multiple LED illuminating apparatuses without using splitters to assign signals. Thus, the system can have a simple structure, and can be easy to implement.

The descriptions of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, an LED illuminating apparatus, and a related signal amplifying system are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A Light Emitting Diode (LED) illuminating apparatus, comprising:
a first antenna, a second antenna, a signal amplifier device, an LED light, and an LED driving power supply, wherein:
the LED driving power supply is connected with the signal amplifier device and the LED light to drive the LED light to emit light and to provide power to the signal amplifier device;
the signal amplifier device comprises a first duplexer, a second duplexer, a downlink, and an uplink, wherein:
the downlink includes a first power controller, a first low-noise amplifier, a first filter, a first signal amplifier, a first coupler, and a first isolator that are connected in series,
an input terminal of the first low-noise amplifier is connected with an output terminal of the first duplexer,
an output terminal of the first isolator is connected with an input terminal of the second duplexer,
a power comparator input port of the first power controller is connected with a coupling port of the first coupler, and
a power comparator output port of the first power controller is connected with a power control port of the first signal amplifier;
the first duplexer is connected with the first antenna and an output terminal of the uplink, and the second duplexer is connected with the second antenna and an input terminal of the uplink;
the first antenna receives a base station signal, and transmits the base station signal to the signal amplifier device;
the signal amplifier device amplifies the base station signal, and transmits the amplified base station signal to the second antenna;
the second antenna transmits the amplified base station signal to a terminal;
the second antenna receives a terminal signal, and transmits the terminal signal to the signal amplifier device;
the signal amplifier device amplifies the terminal signal, and transmits the amplified terminal signal to the first antenna; and
the first antenna transmits the amplified terminal signal to a base station.

2. The LED illuminating apparatus of claim 1, wherein the first antenna and the second antenna are integrated into the LED illuminating apparatus.

3. The LED illuminating apparatus of claim 1, wherein the first antenna and the second antenna are located separately from the LED light, the LED driving power supply, and the signal amplifier device.

4. The LED illuminating apparatus of claim 1, wherein:
the first antenna is connected to a radio frequency port of the first duplexer; and
the second antenna is connected to a radio frequency port of the second duplexer.

5. The LED illuminating apparatus of claim 4, wherein:
the first duplexer receives the base station signal transmitted from the first antenna, and transmits the base station signal to the downlink;
the downlink amplifies the base station signal, and transmits the amplified base station signal to the second duplexer;
the second duplexer receives the amplified base station signal, and transmits the amplified base station signal to the terminal via the second antenna;
the second duplexer further receives the terminal signal transmitted from the second antenna, and transmits the terminal signal to the uplink;
the uplink amplifies the terminal signal, and transmits the amplified terminal signal to the first duplexer; and
the first duplexer further receives the amplified terminal signal, and transmits the amplified terminal signal to the base station via the first antenna.

6. The LED illuminating apparatus of claim 1, wherein:
the first low-noise amplifier amplifies the base station signal transmitted from the first duplexer, and sends the amplified base station signal to the first filter;
the first filter filters the amplified base station signal, and sends the filtered base station signal to the first signal amplifier;
the first signal amplifier re-amplifies the filtered base station signal, and sends the re-amplified base station signal to the first coupler; and
the first coupler samples the re-amplified base station signal, and sends the sampled base station signal to the first power controller through the coupling port of the first coupler.

7. The LED illuminating apparatus of claim 6, wherein:
the first coupler further sends the sampled base station signal to the first isolator through an output port of the first coupler;
the first power controller converts the sampled base station signal into a first level signal by using a power comparator, and sends the first level signal back to the first signal amplifier to control a gain of the first signal amplifier; and
the first isolator transmits the re-amplified base station signal to the second antenna via the second duplexer, and isolates the terminal signal transmitted to the second duplexer.

8. The LED illuminating apparatus of claim 7, wherein:
a sampling ratio of the first coupler is 15-25 dB.

9. The LED illuminating apparatus of claim 8, wherein:
the first power controller sets a value of a first reference power based on a current wireless communication signal environment; and
the first power controller further compares the sampled base station signal with the first reference power, and generates the first level signal based on the comparison.

10. The LED illuminating apparatus of claim 5, wherein:
the uplink includes a second power controller, a second low-noise amplifier, a second filter, a second signal amplifier, a second coupler, and a second isolator that are connected in series;
an input terminal of the second low-noise amplifier is connected with an output terminal of the second duplexer;
an output terminal of the second isolator is connected with an input terminal of the first duplexer;
a power comparator input port of the second power controller is connected with a coupling port of the second coupler; and
a power comparator output port of the second power controller is connected with a power control port of the second signal amplifier.

11. The LED illuminating apparatus of claim 10, wherein:
the second low-noise amplifier amplifies the terminal signal transmitted from the second duplexer, and sends the amplified terminal signal to the second filter;
the second filter filters the amplified terminal signal, and sends the filtered terminal signal to the second signal amplifier;
the second signal amplifier re-amplifies the filtered terminal signal, and sends the re-amplified terminal signal to the second coupler; and
the second coupler samples the re-amplified terminal signal, and sends the sampled terminal signal to the second power controller through the coupling port of the second coupler.

12. The LED illuminating apparatus of claim 11, wherein:
the second coupler further sends the sampled terminal signal to the second isolator through an output port of the second coupler;
the second power controller converts the sampled terminal signal into a second level signal by using a power, and sends the second level signal back to the second signal amplifier to control a gain of the second signal amplifier; and
the second isolator transmits the re-amplified terminal signal to the first antenna via the first duplexer, and isolates the base station signal transmitted to the first duplexer.

13. The LED illuminating apparatus of claim 12, wherein:
a sampling ratio of the second coupler is 15-25 dB.

14. The LED illuminating apparatus of claim 13, wherein:
the second power controller sets a value of a second reference power based on a current wireless communication signal environment; and
the second power controller further compares the sampled terminal signal with the second reference power, and generates the second level signal based on the comparison.

15. A signal amplifying system, comprising:
a base station;
a terminal; and
a plurality of LED illuminating apparatuses according to claim 1.

16. The signal amplifying system of claim 15, wherein:
the plurality of LED illuminating apparatuses are located at different locations;
the plurality of LED illuminating apparatuses receive the base station signal and the terminal signal from the base station and the terminal respectively, and amplify the base station signal and the terminal signal; and
the plurality of LED illuminating apparatuses further receive the amplified base station signal and the amplified terminal signal from another LED illuminating apparatus, and re-amplify the amplified base station signal and the amplified terminal signal.

17. The signal amplifying system of claim 16, wherein:
at least one of the LED illuminating apparatuses are located inside a signal range of the base station; and
at least one of the LED illuminating apparatuses are located inside a signal range of the terminal.

18. A Light Emitting Diode (LED) illuminating apparatus, comprising:
a first antenna, a second antenna, a signal amplifier device, an LED light, and an LED driving power supply, wherein:
the LED driving power supply is connected with the signal amplifier device and the LED light to drive the LED light to emit light and to provide power to the signal amplifier device;
the signal amplifier device comprises a first duplexer, a second duplexer, a downlink, and an uplink, wherein:
the uplink includes a second power controller, a second low-noise amplifier, a second filter, a second signal amplifier, a second coupler, and a second isolator that are connected in series,
an input terminal of the second low-noise amplifier is connected with an output terminal of the second duplexer,
an output terminal of the second isolator is connected with an input terminal of the first duplexer,
a power comparator input port of the second power controller is connected with a coupling port of the second coupler, and
a power comparator output port of the second power controller is connected with a power control port of the second signal amplifier;
the first duplexer is connected with the first antenna and an input terminal of the downlink, and the second duplexer is connected with the second antenna and an output terminal of the downlink;
the first antenna receives a base station signal, and transmits the base station signal to the signal amplifier device;
the signal amplifier device amplifies the base station signal, and transmits the amplified base station signal to the second antenna;
the second antenna transmits the amplified base station signal to a terminal;
the second antenna receives a terminal signal, and transmits the terminal signal to the signal amplifier device;
the signal amplifier device amplifies the terminal signal, and transmits the amplified terminal signal to the first antenna; and
the first antenna transmits the amplified terminal signal to a base station.

* * * * *